(12) United States Patent
Insanic (10) Patent No.: US 10,037,522 B2
(45) Date of Patent: Jul. 31, 2018

(54) NEAR-FIELD COMMUNICATION (NFC) SYSTEM AND METHOD FOR PRIVATE NEAR-FIELD COMMUNICATION

(75) Inventor: Edin Insanic, Belmont, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1385 days.

(21) Appl. No.: 13/352,024

(22) Filed: Jan. 17, 2012

(65) Prior Publication Data

US 2013/0185213 A1 Jul. 18, 2013

(51) Int. Cl.
*G06Q 20/32* (2012.01)
*H04B 5/00* (2006.01)

(52) U.S. Cl.
CPC .......... *G06Q 20/32* (2013.01); *H04B 5/0031* (2013.01)

(58) Field of Classification Search
CPC ..... G06K 7/0008; H04W 88/06; H04L 9/002; H04B 5/0075; G06Q 30/0234
USPC ................................................... 705/50–79
See application file for complete search history.

(56) References Cited

U.S. PATENT DOCUMENTS

| 7,841,528 | B2 | 11/2010 | Savry et al. | |
|---|---|---|---|---|
| 8,350,668 | B2 * | 1/2013 | Busch-Sorensen | G06K 19/07309 340/10.1 |
| 2004/0179510 | A1 | 9/2004 | Kuffner et al. | |
| 2005/0058292 | A1 * | 3/2005 | Diorio .................. | G06K 7/0008 380/270 |
| 2005/0163199 | A1 * | 7/2005 | Wang ...................... | H04B 1/712 375/148 |
| 2007/0293142 | A1 | 12/2007 | Dehmas | |
| 2009/0088077 | A1 * | 4/2009 | Brown ...................... | H04B 5/02 455/41.2 |

(Continued)

FOREIGN PATENT DOCUMENTS

| WO | WO-01/15064 A1 | 3/2001 |
|---|---|---|
| WO | WO-2013/109764 A1 | 7/2013 |

OTHER PUBLICATIONS

Hancke ("Noisy Carrier Modulation for HF RFID", EURASIP Proceedings, RFID2007), attached as PDF entitled Hancke_RandomNoise_EurasipProceedings2007. Pdf.*

(Continued)

*Primary Examiner* — James D Nigh
*Assistant Examiner* — Margaret M Neubig
(74) *Attorney, Agent, or Firm* — Schwegman Lundberg & Woessner, P.A.

(57) ABSTRACT

Embodiments of a near-field communication (NFC) system and method for private near-field communication are generally described herein. In some embodiments, a resonance-coupled channel is masked with a random channel-masking signal. The channel-masking signal may be scaled based on near-field channel conditions. Signals received through the channel may be unmasked with the scaled channel-masking signal to determine data that may have been conveyed by an NFC transmitting device by affecting the impedance of the resonance-coupled channel. In some embodiments, a reference signal may be scrambled with a mask to generate the channel-masking signal. The mask may include at least one of a random symbol mask, an amplitude mask and a phase mask. For additional privacy, the mask may include a random symbol mask and at least one of an amplitude mask and a phase mask.

34 Claims, 2 Drawing Sheets

(56) References Cited

U.S. PATENT DOCUMENTS

| | | | |
|---|---|---|---|
| 2009/0138715 A1 | 5/2009 | Xiao et al. | |
| 2010/0015917 A1* | 1/2010 | Symons | H04B 5/0075 455/41.1 |
| 2010/0287386 A1* | 11/2010 | Feix | H04L 9/002 713/193 |
| 2011/0084796 A1 | 4/2011 | Savry | |
| 2011/0127953 A1* | 6/2011 | Walley | G06K 7/10207 320/108 |
| 2012/0116861 A1* | 5/2012 | Dobyns | G06Q 30/0234 705/14.34 |
| 2012/0309354 A1* | 12/2012 | Du | H04W 12/02 455/411 |
| 2013/0109304 A1* | 5/2013 | Marcu | G06K 7/0008 455/41.1 |

OTHER PUBLICATIONS

Hancke ("Noisy Carrier Modulation for HF RFID", EURASIP Proceedings, RFID2007), (Year: 2007).*

Wu ("A method for secure communications over a public fiber-optical network", Optics Express, 3738, vol. 14, No. 9, May 2006, attached as PDF file, RandomPhaseSecurity.pdf (Year: 2006).*

AN680, Mircochip Technology Inc, 1998, downloaded from http://ww1.microchip.com/downloads/en/AppNotes/00680b.pdf and attached as PDF file, "DataModFreqBased.pdf". (Year: 1998).*

Hancke ("Noisy Carrier Modulation for HF RFID", EURASIP Proceedings, RFID2007), attached in prior office action as PDF entitled Hancke_RandomNoise_EurasipProceedings2007. Pdf. (Year: 2007).*

Wu ("A method for secure communications over a public fiber-optical network", Optics Express, 3738, vol. 14, No. 9, May 2006, attached in previous office action as PDF file, RandomPhaseSecurity.pdf ( (Year: 2006).*

AN680, Mircochip Technology Inc, 1998, downloaded from http://ww1.microchip.com/downloads/en/AppNotes/00680b.pdf and attached in previous office action as PDF file, "DataModFreqBased.pdf". (Year: 2006).*

"European Application Serial No. 13701351.2, Office Action datd Aug. 29, 2014", 3 pgs.

"International Application Serial No. PCT/US2013/021955, International Preliminary Report on Patentability dated Jul. 31, 2014", 10 pgs.

"International Application Serial No. PCT/US2013/021955, International Search Report dated Jul. 1, 2013", 4 pgs.

"International Application Serial No. PCT/US2013/021955, Written Opinion dated Jul. 1, 2013", 8 pgs.

Hancke, G. P., "Noisy Carrier Modulation for HF RFID", *First International EURASIP Workshop on RFID Technology*, Austria, (2007), 4 pgs.

Hancke, G., "Practical Attacks on Proximity Identification Systems (Short Paper)", *Proceedings of the 2006 IEEE Symposium on Security and Privacy (SP '06)*, (May 2006), 6 pgs.

Heydt-Benjamin, T. S., et al., "Vulnerabilities in first-generation RFID-enabled credit cards", *Economic Perspectives*, vol. 33. No. 1, (2009), 50-59.

Juels, A., et al., "The Blocker Tag: Selective Blocking of RFID Tags for Consumer Privacy", *Proceedings of the 10th ACM Conference on Computer and Communications Security, (CCS '03)*, (2003), 9 pgs.

Wyner, A. D., "The Wire-Tap Channel", *Bell Systems Technical Journal*, vol. 54, No. 8, (1975), 1355-1387.

\* cited by examiner

Fig. 4 ved communications. Some embodiments relate to radio-frequency identification (RFID) technology. Some embodiments relate to financial transaction systems. Some embodiments relate to near-field enabled mobile communication devices. Some embodiments relate to private key exchange.

NEAR-FIELD COMMUNICATION (NFC) SYSTEM AND METHOD FOR PRIVATE NEAR-FIELD COMMUNICATION

TECHNICAL FIELD

Embodiments pertain to private near-field communications. Some embodiments relate to radio-frequency identification (RFID) technology. Some embodiments relate to financial transaction systems. Some embodiments relate to near-field enabled mobile communication devices. Some embodiments relate to private key exchange.

BACKGROUND

Near-field communication (NFC) is a wireless communication technique in which the communicating devices are separated by less than a wavelength. Near-field communication is being adopted by the mobile phone industry for financial transactions and is anticipated to replace the use of magnetic strips of credit cards. One issue with near-field communication is privacy. Although near-field communication takes place between closely located devices, an eavesdropper may still be able to determine the information being exchanged. Conventional encryption techniques that use either symmetric or asymmetric keys have several drawbacks including increased complexity, cost and processing requirements.

Thus, there are general needs for private near-field communication systems and methods that reduce the complexity, cost and processing requirements. There are also general needs for private near-field communication systems and methods suitable for financial transactions. There are also general needs for private near-field communication systems and methods suitable for key exchange. There are also general needs for private near-field communication systems and methods suitable for smart phones and mobile communication devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
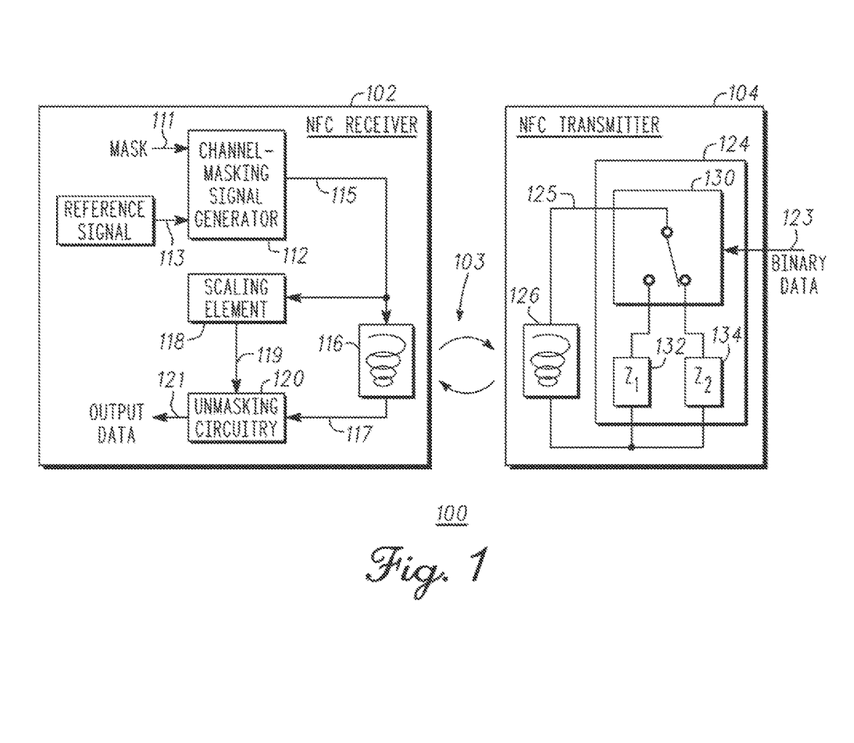
FIG. 1 is a functional block diagram of a near-field communication system for resonance-coupled communications in accordance with some embodiments.

FIG. 1 is a functional block diagram of a near-field communication system for resonance-coupled communications in accordance with some embodiments. NFC system 100 includes an NFC receiver 102 and an NFC transmitter 104. In accordance with embodiments, the NFC receiver 102 may receive data privately from the NFC transmitter 104 through a resonance-coupled channel 103. In these embodiments, the NFC receiver 102 may mask the resonance-coupled channel 103 with a random channel-masking signal and may scale the channel-masking signal based on near-field channel conditions. The NFC receiver 102 may also unmask signals received through the channel 103 with the scaled channel-masking signal to determine data that may be conveyed by the NFC transmitter 104. In these embodiments, the NFC transmitter 104 may convey the data by affecting an impedance of the resonance-coupled channel 103. The NFC receiver 102 may be positioned within the near field of the NFC transmitter 104, and the application of the channel-masking signal to the resonance-coupled channel 103 may create a private resonance-coupled channel.

The NFC receiver 102 may include a channel-masking signal generator 112 to randomly scramble a reference signal 113 and generate a channel-masking signal 115 for application to the resonance-coupled channel 103. The NFC receiver 102 may also include a scaling element 118 to scale the channel-masking signal 115 based, at least in part, on near-field channel conditions. The NFC receiver 102 may also include unmasking circuitry 120 to combine the scaled channel-masking signal 119 with resonance-coupled signals 117 received through the resonance-coupled channel 103 to generate binary data as output data 121. The output data 121 may comprise unmasked bits.

The NFC transmitter 104 may include an impedance-switching element 130 to affect an impedance of the resonance-coupled channel 103 based on binary data 123 to be conveyed to the NFC receiver 102. The output data 121 generated by the unmasking circuitry 120 may correspond to the binary data 123.

Accordingly, the binary data 123 may be conveyed by modulating the impedance of the resonance-coupled channel 103 that is masked by the channel-masking signal 115. This allows the unmasking circuitry 120 to recover the binary data 123 by unmasking the resonance-coupled signals 117 received through the resonance-coupled channel 103 with the scaled channel-masking signal 119. In this way, a private channel is established through impedance coupling allowing the private communication of the binary data 123 between NFC devices since the resonance-coupled signals 117 may be incomprehensible without knowledge of the channel-masking signal 115. In these embodiments, the channel-masking signal 115 may be random, inhibiting an eavesdropper from locking onto signals within the resonance-coupled channel 103 and determining any values of the binary data 123.

The impedance-switching element 130 of the NFC transmitter 104 may affect the impedance of the resonance-coupled channel 103 by switching between a first impedance 132 and a second impedance 134 based on the binary data 123 that is to be conveyed to die NFC receiver 102. The first impedance 132 is illustrated as impedance $Z_1$ and the second impedance 134 is illustrated as impedance $Z_2$. In these embodiments, although the NFC transmitter 104 is referred to as a transmitter, the NFC transmitter 104 does not actually transmit the binary data 123 in the conventional sense in which a carrier wave or other RF signal is modulated with data. The NFC transmitter 104 modulates the impedance of the resonance-coupled channel 103 based on the binary data 123.

The first impedance 132 may represent an open and the second impedance 134 may represent a short allowing the impedance-switching element 130 to modulate the impedance of the resonance-channel coupled 103 between a minimum and maximum. Other impedance values may be used for the first impedance 132 and the second impedance 134 depending on the amount of privacy desired and the amount of scrambling provided by the channel-masking signal generator 112. For example, various impedance values between a short and an open may be used.

The NFC receiver 102 may also include a reactive element 116 to affect the resonance-coupled channel 103 with the channel-masking signal 115. The reactive element 116 may also be used receive the resonance-coupled signals 117. The NFC transmitter 104 may also include a reactive element 126 to modulate the resonance-coupled channel 103 based on a switched impedance signal 125 provided by the impedance switching element 124. In these embodiments, the reactive elements 116 and 126 may be mutually coupled when operating in their near fields.

The switching between the first impedance 132 and the second impedance 134 may be performed at a rate based on the resonance frequency of the resonance-coupled channel 103. The switching rate may range from several kHz to several hundred kHz although other switching rates may also be suitable. The NFC transmitter 104 may modulate the impedance of reactive element 126 based on the bit values of the binary data 123 to modulate the impedance of the resonance-coupled channel 103. In some of these embodiments, the NFC transmitter 104 may implement a switched-impedance transmission technique, although this is not a requirement. In these embodiments, the unmasking circuitry 220 may combine the scaled channel-masking signal 119 with the resonance-coupled signals 117 received through the resonance-coupled channel 103 by the reactive element 116 to generate output data 121, which may correspond to the binary data 123.

In some embodiments, reactive element 116 and reactive element 126 may be mutually-coupled inductors that emit electromagnetic energy. In some embodiments, reactive element 116 and reactive element 126 may be mutually-coupled antennas operating in their near-fields. The antennas may comprise coils of wire and may be helical coils although the scope of the embodiments is not limited in this respect as other antenna, inductor and capacitor configurations may be suitable.

In some embodiments, the NFC receiver 102 and the NFC transmitter 104 may be configured to communicate through an array of channels in which each channel has a different resonance. In these embodiments, different sets of reactive elements may be used for each channel.

In some embodiments, the NFC receiver 102 may be part of an NFC reader and the NFC transmitter 104 may be part of an NFC tag. Unlike a conventional radio frequency identification (RFID) tag system, data is conveyed through a private channel created with the channel-masking signal 115. Unlike conventional RFID tag systems, the NFC receiver 102 does not operate as a clock transmitter since the NFC receiver 102 does not transmit a clock signal, and the NFC transmitter 104 does not operate as a clock receiver since the NFC transmitter 104 does not receive a clock signal.

The scaling element 118 may scale the channel-masking signal 115 in both amplitude and phase based on parameters determined during a calibration process. In these embodiments, the scaling by scaling element 118 may take into account, among other things, the delay between the scaled channel-masking signal 119 and the received resonance-coupled signal 117 to allow the unmasking circuitry 120 to effectively remove the channel effects and the effects of the channel-masking signal 115. In these embodiments, the phase scaling may allow the unmasking circuitry 120 to operate on signals that have the same temporal reference. The calibration process is discussed in more detail below.

Figure 2:
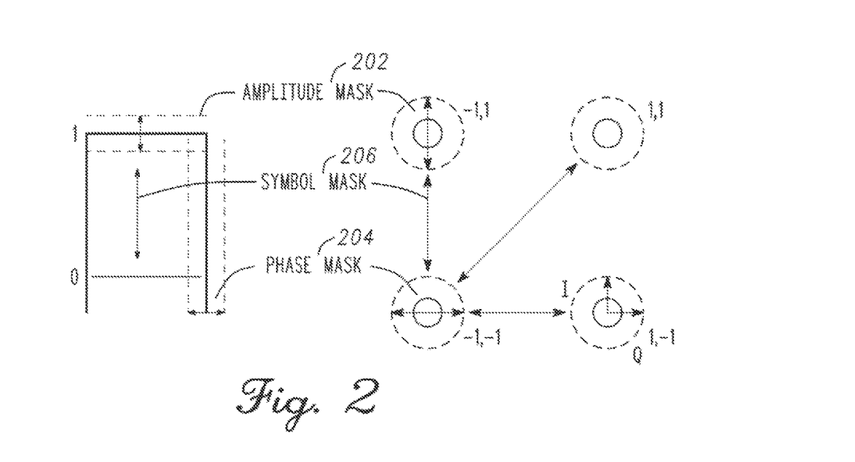
FIG. 2 illustrates the generation of a channel-masking signal in accordance with some embodiments.

FIG. 2 illustrates the generation of a channel-masking signal in accordance with some embodiments. In these embodiments, the channel-masking signal generator 112 (FIG. 1) may scramble the reference signal 113 (FIG. 1) by modulating the reference signal 113 with a mask 111 (FIG. 1) to generate the channel-masking signal 115 (FIG. 1). The mask 111 may comprise a random symbol mask 206, and at least one of an amplitude mask 202 and a phase mask 204. In some embodiments, the symbol mask 206 may be randomly generated allowing the reference signal 113 to be randomly scrambled. In some embodiments, a symbol mask 206, an amplitude mask 202 and a phase mask 204 may be used for maximum privacy.

In other embodiments (e.g., when less privacy is desired) only a symbol mask 206 may be used, or a symbol mask 206 with either an amplitude mask 202 or a phase mask 204 may be used. In some embodiments, the symbol mask 206 may be a bit mask, the amplitude mask 202 may be a level mask, and the phase mask 204 may be a temporal mask, although the scope of the embodiments is not limited in this respect. In these embodiments, the masking of the binary data 123 may be achieved by placing a confidential signal in the same space-time domain as the channel-masking signal 115. In some embodiments, the symbol mask 206, the amplitude mask 202 and the phase mask 204 comprise non-correlated random sequences.

The channel-masking signal generator 112 may generate the channel-masking signal 115 by applying the symbol mask 206 to the reference signal 113 to generate a symbol-modulated signal, which may be amplitude and/or phase modulated respectively with the amplitude mask 202 and/or the phase mask 204. In some of these embodiments, the reference signal 113 may be a sinusoidal signal, and the application of the symbol mask 206 to the sinusoidal signal may result in a random symbol-modulated signal. Random amplitude and or phase modulation may be added for increased privacy, which may help reduce the ability of an eavesdropper to exploit environmental and hardware signatures that may be conventionally exploited by the use of a symbol mask alone.

In some embodiments, the amplitude mask 202 and die phase mask 204 may be used to generate in-phase (I) and quadrature-phase (Q) signals. In some embodiments, the reference signal 113 may be randomly generated as a symbol or as a bit modulated signal. In some embodiments, the channel-masking signal 115 may be generated by summing a random signal with amplitude modulated and phase modulated signals. In some embodiments, the symbol mask 206 may comprise a randomly constructed scrambling signal that corresponds to a particular modulation level, such as on/off keying, BPSK, and QAM, although the scope of the embodiments is not limited in this respect.

The channel-masking signal 115 may be a digital signal and the NFC receiver 102 may include digital-to-analog converter to convert a digital channel-masking signal to an analog signal for application to the reactive element 116 for affecting the channel impedance. In these embodiments, the NFC receiver 102 may also include an analog-to-digital converter to convert analog signals received through the reactive element 116 to digitals signals for use by the unmasking circuitry 120.

In accordance with embodiments, die NFC receiver 102 may receive data privately from the NFC transmitter 104 through the resonance-coupled channel 103 and may engage in near-field communication when the NFC receiver 102 is positioned within a near field of the NFC transmitter 104. The near field may be less than about a wavelength of an operating frequency, although less than about a quarter-wavelength may be preferable. The operating frequency may be based on the resonance frequency of the resonance-coupled channel 103. In some embodiments, the reference signal 113 may be a carrier-wave (CW) signal at the operating frequency that is scrambled as described above, although other signal types may also be used.

In accordance with embodiments, the scaling element 118 may provide a residual signal that is zero or close to zero (i.e., as an output) when the NFC transmitter 104 is not affecting the impedance of the resonance-coupled channel 103. Scaling parameters to provide a zero output may be determined during the calibration process. The NFC receiver 102 and the NFC transmitter 104 may perform the calibration process when operating in the near field. The calibration process may determine parameters for use by the scaling element 118. In some embodiments, a training sequence known to both the NFC receiver 102 and the NFC transmitter 104 may be used for calibration. The calibration process may determine a load-impedance estimate of the resonance-coupled channel 103 that takes into account near-field effects of the NFC receiver 102 and the NFC transmitter 104. The calibration process may be performed prior to conveyance of binary data 123 by the NFC transmitter 104. In some embodiments, the calibration process may include the use of a handshake (e.g., a handshake protocol) that includes the use of a known training sequence to determine the channel effects and the signal delay between the NFC receiver 102 and the NFC transmitter 104. The delay may be used to determine the phase scaling by the scaling element 118. The channel effects may be used to determine the amplitude scaling. In some embodiments, the scaling element 118 may perform an impedance transform to channel-masking signal 115 based, at least in part, on near-field effects introduced by the NFC transmitter 104 determined during the calibration process.

In some embodiments, the amplitude mask 202 may provide a random noise mask to help conceal amplitude signature differences between the communicating parties and/or the limitations of scaling element 118 at least in part due to the accuracy of calibration. The phase mask 204 may provide a random noise mask to help conceal temporal signature differences between the communicating parties and/or limitations of scaling element 118 at least in part due to the accuracy of calibration.

In some embodiments, the scaling element 118 may address any large-scale variations in the received signal 117, such as those originating due to the environmental influence (i.e., physical distance) and/or hardware inconsistencies between devices. The scaling element 118 may include a buffer or delay element to mimic the delay introduced by the physical separation between the NFC receiver 102 and the NFC transmitter 104. In digital embodiments, the buffer or delay element may be a digital memory buffer. In analog embodiments, an analog delay line may be used.

The unmasking circuitry 120 may include a transfer function block to modify the received signals 117 to compensate for medium and physical implementation limitations. For example, transfer function block may operate in the impedance domain and may adjust a characteristic impedance of the NFC receiver 102 to match a characteristic impedance of the NFC transmitter 104 and the changes introduced by the physical channel environment.

Although FIG. 1 illustrates the NFC receiver 102 and the NFC transmitter 104 having elements for the one-way communication of binary data 123 from the NFC transmitter 104 to the NFC receiver 102, the scope of the embodiments is not limited in this respect. In some two-way communication embodiments, each NFC device may include the circuitry of both the NFC receiver 102 and the NFC transmitter 104 to provide for two-way communication of data through separate private channels. The NFC receiver 102 and the NFC transmitter 104 may include additional circuitry, such as a processor or controller for coordinating the activities of the illustrated functional elements as well as performing calibration.

In some embodiments, a method for key exchange between devices using NFC is provided. In these embodiments, an NFC device may mask a resonance-coupled channel with a random channel-masking signal. The first NFC device may scale the channel-masking signal based on near-field channel conditions and may unmask signals received through the channel with the scaled channel-masking signal to determine a key conveyed by a second NFC device. The second NFC device may convey the key by affecting an impedance of the resonance-coupled channel based on binary values of the key.

In some embodiments, a system for secure financial transactions between NFC devices is provided. In these embodiments, the system includes an NFC transmitter and an NFC receiver. The NFC receiver may receive financial data from the NFC transmitter through a resonance-coupled channel when positioned within a near-field of the NFC transmitter. The NFC receiver may include a channel-masking signal generator to scramble a reference signal and generate a channel-masking signal for affecting the resonance-coupled channel, and a scaling element to scale the channel-masking signal based on near-field channel conditions. The NFC receiver may also include unmasking circuitry to combine the scaled channel-masking signal with signals received through the resonance-coupled channel to generate binary data. The NFC transmitter may affect the impedance of the resonance-coupled channel based on values of the financial data to be conveyed to the NFC receiver.

In these embodiments, the financial data may include information similar to the information that would be conventionally conveyed by a magnetic strip of a credit card for a credit-card transaction, although the scope of the embodiments is not limited in this respect. In these embodiments, private communication of the financial, medical and other confidential data may be achieved through the random masking of the impedance-coupled channel. The NFC transmitter may be provided within a mobile communication device (e.g., a smart phone) and the NFC receiver may be provided within a point-of-sale (POS) terminal to allow financial information to be conveyed in private.

Figure 3:
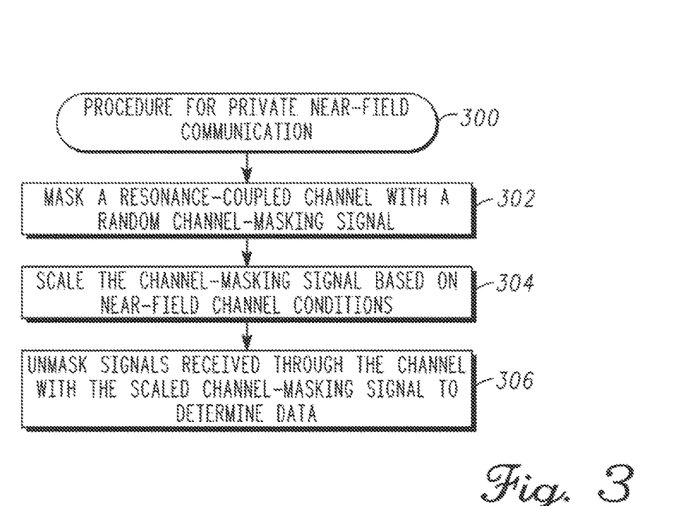
FIG. 3 is a procedure for private near-field communication in accordance with some embodiments.

FIG. 3 is a procedure for private near-field communication in accordance with some embodiments. Procedure 300 may be performed by an NFC receiver, such as NFC receiver 102 (FIG. 1) although other device configurations may also be suitable. Procedure 300 may be implemented to receive data privately from an NFC transmitter, such as NFC transmitter 104 (FIG. 1), through a resonance-coupled channel.

In operation 302, a resonance-coupled channel may be masked with a random channel-masking signal. In some embodiments, a reference signal may be scrambled by modulating it with a mask to generate the channel-masking signal. For true privacy, the mask may comprise a random symbol mask and at least one of an amplitude mask and a phase mask. For lower privacy applications, one of a random symbol mask, an amplitude mask and a phase mask may be used. The NFC receiver may be positioned within the near field of an NFC transmitter, and the application of the channel-masking signal to the resonance-coupled channel may create a private resonance-coupled channel.

In operation 304, the channel-masking signal may be scaled based, at least in part, on near-field channel conditions. The channel-masking signal may be scaled in both amplitude and phase based on scaling parameters determined during a calibration process.

In operation 306, signals received through the resonance-coupled channel may be unmasked by combining the scaled channel-masking signal with the received signals to generate binary data as an output. In these embodiments, the NFC transmitter may affect the impedance of the resonance-coupled channel based on binary data to be conveyed.

Figure 4:
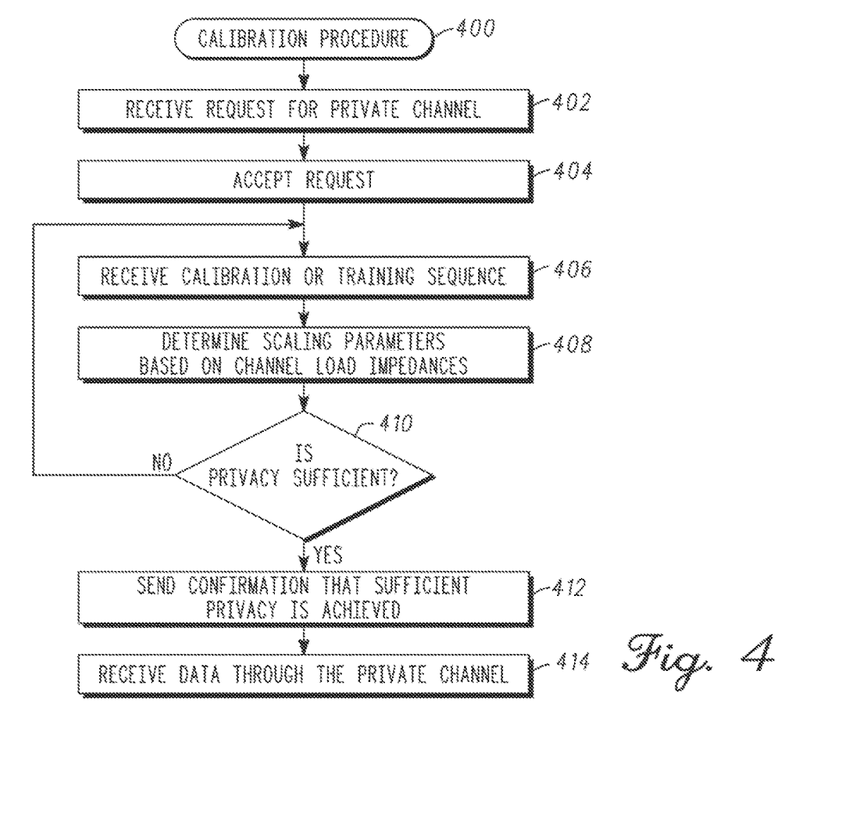
FIG. 4 is a calibration procedure for near-field communication through a private channel in accordance with some embodiments.

FIG. 4 is a calibration procedure for near-field communication through a private channel in accordance with some embodiments. Calibration procedure 400 may be performed by an NFC receiver, such as NFC receiver 102 (FIG. 1), to determine calibration parameters for private NFCs with an NFC transmitter, such as NFC transmitter 104 (FIG. 1).

In operation 402, a request may be received for a private channel, and in operation 404, the request may be accepted. In some embodiments, the NFC transmitter may request the private channel (e.g., when it has data to send) and the NFC receiver may accept the request, although the scope of the embodiments is not limited in this respect as the NFC receiver may request a private channel and the NFC transmitter may accept the request.

In operation 406, the NFC receiver may receive a known training sequence that is sent by the NFC transmitter. The training sequence may be sent by affecting the impedance of the resonance-coupled channel based on values of the training sequence. For example, an impedance-switching element may be used to affect the impedance of the resonance-coupled channel by switching between a first impedance and a second impedance based on binary values of the training sequence. During receipt of the training sequence, the NFC receiver may scramble a reference signal and may generate a channel-masking signal for application to the resonance-coupled channel.

In operation 408, the NFC receiver may determine calibration parameters based on channel load impedances due to near-field channel conditions. The calibration parameters may be based on a comparison between the known training sequence, the channel masking signal, and signals received through the resonance-coupled channel. The calibration parameters may include the scaling parameters to be used by a scaling element, such as scaling element 118 (FIG. 1).

In operation 410, the NFC receiver may determine whether sufficient privacy is achieved. If sufficient privacy is not achieved, operations 406 and 408 may be repeated and the NFC receiver may change the channel mask. Once sufficient privacy is achieved, the calibration parameters may be stored for use by the scaling element.

In operation 412, the NFC receiver may send a confirmation to the NFC transmitter that sufficient privacy has been achieved.

In operation 414, data may be received through the private channel. In some embodiments, operation 414 may include performing the operations of procedure 300 (FIG. 3).

The calibration procedure 400 may provide the NFC receiver with, among other things, estimates of the load impedances and channel propagation delays, allowing the NFC receiver to adjust its mean signal levels to help provide complete ambiguity, while, at the same time, helping to insure the use of minimum signal levels to address power consumption as well as to provide additional layers of privacy. Although the calibration procedure 400 is performed in an open or unsecure environment and impedances may be determined by an eavesdropper, operations 406-410 may be repeated until the target confidence level of privacy is achieved when combined with the use of a randomly scrambled reference signal.

Embodiments described herein are applicable to several types of near-field communication depending on the system configuration, mode of operation, and desired level of security. In passive modes of operation, the NFC transmitter does not have channel masking or de/encryption capability, so private communication may occur one way. In this situation, the NFC receiver provides the channel masking function. This mode may be used for passive applications such as bus tickets, credit cards and other low-cost RFID tags. In some of these embodiments, an encryption key may also be used.

In some active modes of operation, the NFC receiver and the NFC transmitter may switch their channel-masking functions subsequently. In these embodiments, the NFC receiver may include the functional elements of an NFC transmitter, such as NFC transmitter 104 (FIG. 1), and the NFC transmitter may include the functional elements of an NFC receiver, such as NFC receiver 102 (FIG. 1). In these embodiments, bi-directional data communication may occur within private channels. These modes may be used in systems where sufficient power is available to both NFC devices and in situations where security is not provided by an application layer.

In a hybrid mode of operation, the NFC receiver and the NFC transmitter may perform a key exchange in a secure manner. The keys may be used for open encrypted communications. In a multimodal mode operation, the NFC receiver and the NFC transmitter perform key exchange. Subsequent encrypted communications may occur in a private channel. This multimodal mode may provide a higher level of security because the communications are both encrypted and private.

Although the NFC receiver 102 and the NFC transmitter 104 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the NFC receiver 102 and the NFC transmitter 104 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the NFC receiver 102 and the NFC transmitter 104 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of near-field communication (NFC), the method comprising:
   electromagnetically coupling an NFC receiver with an NFC transmitter through a resonance-coupled channel, the resonance-coupled channel formed by mutually coupled reactive elements operating under near field conditions;
   generating, by the NFC receiver, a reference signal;
   generating, by the NFC receiver, a mask based on a privacy level;
   generating, by the NFC receiver, a channel-masking signal by modulating the reference signal with the mask;
   performing, by the NFC receiver and transmitter, a calibration process, the calibration process comprising:
      transmitting, by the NFC transmitter, a known training sequence by affecting an impedance of the resonance-coupled channel;
      receiving, by the NFC receiver, the known training sequence;
      determining, by the NFC receiver, calibration parameters, including both amplitude and phase scaling parameters, based on channel load impedances due to near-field channel conditions;
   generating, by the NFC receiver, a scaled channel-masking signal by applying the scaling parameters to the channel-masking signal;
   applying, by the NFC receiver, the scaled channel-masking signal to the resonance-coupled channel;
   modulating, by the NFC transmitter, the impedance of the resonance-coupled channel based on bit values of stored binary data; and
   unmasking, by the NFC receiver, a signal received through the resonance-coupled channel and determining the stored binary data.

2. The method of claim 1, wherein modulating the impedance of the resonance-coupled channel comprises varying the impedance in the NFC transmitter between an open and a short.

3. The method of claim 2, wherein the binary data comprises a key used for open encrypted communications.

4. The method of claim 1,
   wherein determining the calibration parameters further comprises determining amplitude and phase scaling parameters that result in a residual signal that is close to zero when the NFC transmitter and the NFC receiver are in NFC communication range but not under the near field conditions.

5. The method of claim 4, wherein determining the calibration parameters further comprises basing the phase scaling parameters on a delay between the scaled channel-masking signal and the resonance-coupled signals and removing effects of the resonance-coupled channel and effects of the channel-masking signal.

6. The method of claim 5, wherein the near field conditions correspond to a channel distance of less than a quarter-wavelength of an operating frequency of communications between the NFC transmitter and the NFC receiver.

7. The method of claim 4, wherein the calibration process further comprises determining scaling parameters for the scaling to provide a zero output when the impedance of the resonance-coupled channel is unaffected by the NFC transmitter.

8. The method of claim 1, wherein the calibration process further comprises determining a load-impedance estimate of the resonance-coupled channel that takes into account near-field effects of the NFC receiver and the NFC transmitter.

9. The method of claim 1, wherein the calibration process further comprises using a handshake that includes a known training sequence and determining, based on the known training sequence, channel effects and signal delay between the NFC receiver and the NFC transmitter, and the scaling comprises phase scaling determined by the signal delay and amplitude scaling determined by the channel effects.

10. The method of claim 1, wherein generating the channel-masking signal comprises generating a random symbol and at least one of a random amplitude and a random phase.

11. The method of claim 1, wherein the channel-masking signal is generated by modulating the reference signal with a random symbol generated using a random symbol mask, a random amplitude generated using an amplitude mask and a random phase generated using a phase mask.

12. The method of claim 11, wherein the channel-masking signal further is generated by modulating the reference signal with a random amplitude generated using an amplitude mask and a random phase generated using a phase mask to generate in-phase (I) and quadrature-phase (Q) signals.

13. The method of claim 1, wherein determining the calibration parameters further comprises addressing large-scale variations in the received resonance-coupled signals Including variations originating due to at least one of physical distance between the NFC receiver and the NFC transmitter or hardware inconsistencies between the NFC receiver and the NFC transmitter.

14. The method of claim 1, wherein determining calibration parameters further comprises determining a transfer function block operating in an impedance domain, and applying the transfer function block to compensate for medium and physical implementation limitations by adjusting a characteristic impedance of the NFC receiver to match a characteristic impedance of the NFC transmitter and changes introduced by a physical channel environment.

15. The method of claim 1, wherein the resonance-coupled channel comprises a plurality of channels in which each channel has a different resonance and is associated with a different set of reactive elements.

16. The method of claim 1, wherein the channel-masking signal is generated by modulating the reference signal using a random symbol mask, the random symbol mask comprising a randomly constructed scrambling signal that corresponds to a particular modulation of the reference signal.

17. The method of claim 1, wherein determining the calibration parameters further comprises determining a delay to be applied to the channel-masking signal to mimic a delay introduced by a physical separation between the NFC receiver and the NFC transmitter.

18. A near-field communication (NFC) system comprising: an NFC transmitter comprising a circuit, the circuit comprising:
   a transmitter reactive element,
   a switch arranged to receive data stored in the NFC transmitter, and an impedance element connected to the transmitter reactive element via the switch, the switch configured to switch an impedance of the circuit based on the data received by the switch at a switching rate based on a resonance frequency of a resonance-coupled channel; and an NFC receiver electromagnetically coupled with the NFC transmitter under near field conditions to receive the data from the NFC transmitter through the resonance-coupled channel and to generate a mask based on privacy level, the NFC receiver comprising:

a reference signal source to supply a reference signal;

a channel-masking signal generator connected with the reference signal source, the channel-masking signal generator configured-to generate a random channel-masking signal by modulating the reference signal with the mask;

a scaling element connected with the channel-masking signal generator, the scaling element configured to determine scaling parameters based on the near field conditions the NFC receiver and transmitter are configured to perform a calibration process, the NFC transmitter being configured to transmit a known training sequence by affecting an impedance of the resonance-coupled channel, the NFC receiver being configured to receive the known training sequence and the NFC receiver being configured to determine calibration parameters, including both amplitude and phase scaling parameters, based on channel load impedances due to near-field channel conditions;

the NFC receiver configured to generate a scaled channel-masking signal by applying the scaling parameters to the channel-masking signal;

the NFC receiver configured to apply the scaled channel-masking signal to the resonance-coupled channel;

the NFC transmitter configured to modulate the impedance of the resonance-coupled channel based on bit values of stored binary data;

the NFC receiver configured to unmask a signal received through the resonance-coupled channel and determine the stored binary data.

19. The NFC system of claim 18, wherein the NFC transmitter is configured to vary the impedance in the NFC transmitter between an open and a short to modulate the impedance of the resonance-coupled channel.

20. The NFC system of claim 19, wherein the stored binary data comprises a key used for open encrypted communications.

21. The NFC system of claim 18, wherein determination of the calibration parameters comprises the NFC receiver being configured to determine amplitude and phase scaling parameters that result in a residual signal that is close to zero when the NFC transmitter and the NFC receiver are in NFC communication range but not under the near field conditions.

22. The NFC system of claim 21, wherein the determination of the calibration parameters further comprises the NFC receiver being configured to base the phase scaling parameters on a delay between the scaled channel-masking signal and the resonance-coupled signals and remove effects of the resonance-coupled channel and effects of the channel-masking signal.

23. The NFC system of claim 22, wherein the near field conditions correspond to a channel distance of less than a quarter-wavelength of an operating frequency of communications between the NFC transmitter and the NFC receiver.

24. The NFC system of claim 21, wherein the calibration process further comprises a determination of scaling parameters for the scaling to provide a zero output when the impedance of the resonance-coupled channel is unaffected by the NFC transmitter.

25. The NFC system of claim 18, wherein the calibration process further comprises a determination of a load-impedance estimate of the resonance-coupled channel that takes into account near-field effects of the NFC receiver and the NFC transmitter.

26. The NFC system of claim 18, wherein the calibration process further comprises use of a handshake that includes a known training sequence and a determination, based on the known training sequence, of channel effects and signal delay between the NFC receiver and the NFC transmitter, and the scaling comprises a phase scaling determined by the signal delay and amplitude scaling determined by the channel effects.

27. The NFC system of claim 18, wherein generation of the channel-masking signal comprises the NFC receiver being configured to generate a random symbol and at least one of a random amplitude and a random phase.

28. The NFC system of claim 18, wherein generation of the channel-masking signal comprises the NFC receiver being configured to modulate the reference signal with a random symbol generated using a random symbol mask, a random amplitude using an amplitude mask and a random phase using a phase mask.

29. The NFC system of claim 28, wherein generation of the channel-masking signal comprises the NFC receiver further being configured to modulate the reference signal with a random amplitude generated using an amplitude mask and a random phase using a phase mask to generate in-phase (I) and quadrature-phase (Q) signals.

30. The NFC system of claim 18, wherein the determination of the calibration parameters further comprises the NFC receiver being configured to address large-scale variations in the received resonance-coupled signals Including variations originating due to at least one of physical distance between the NFC receiver and the NFC transmitter or hardware inconsistencies between the NFC receiver and the NFC transmitter.

31. The NFC system of claim 18, wherein the determination of the calibration parameters further comprises the NFC receiver being configured to determine a transfer function block operating in an impedance domain, and apply the transfer function block to compensate for medium and physical implementation limitations by adjustment of a characteristic impedance of the NFC receiver to match a characteristic impedance of the NFC transmitter and changes introduced by a physical channel environment.

32. The NFC system of claim 18, wherein the resonance-coupled channel comprises a plurality of channels in which each channel has a different resonance and is associated with a different set of reactive elements.

33. The NFC system of claim 18, wherein generation of the channel-masking signal comprises the NFC receiver further being configured to modulate the reference signal using a random symbol mask, the random symbol mask comprising a randomly constructed scrambling signal that corresponds to a particular modulation of the reference signal.

34. The NFC system of claim 18, wherein the determination of the calibration parameters further comprises the NFC receiver being configured to determine a delay to be applied to the channel-masking signal to mimic a delay introduced by a physical separation between the NFC receiver and the NFC transmitter.

\* \* \* \* \*

UNITED STATES PATENT AND TRADEMARK OFFICE
CERTIFICATE OF CORRECTION

PATENT NO. : 10,037,522 B2  
APPLICATION NO. : 13/352024  
DATED : July 31, 2018  
INVENTOR(S) : Edin Insanic Page 1 of 1

It is certified that error appears in the above-identified patent and that said Letters Patent is hereby corrected as shown below:

On the Title Page

On page 2, in Column 2, under "Other Publications", Line 9, delete "datd" and insert --dated-- therefor In the Specification In Column 2, Line 54, delete "die" and insert --the-- therefor In Column 4, Line 39, delete "and or" and insert --and/or-- therefor In Column 4, Line 44, delete "die" and insert --the-- therefor In Column 4, Line 65, delete "die" and insert --the-- therefor Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*